United States Patent
Abou-Zeid

(10) Patent No.: US 10,160,329 B2
(45) Date of Patent: Dec. 25, 2018

(54) ELECTRICAL VEHICLE CHARGING SYSTEM

(71) Applicant: Pierre Abou-Zeid, Oro Valley, AZ (US)

(72) Inventor: Pierre Abou-Zeid, Oro Valley, AZ (US)

( * ) Notice: Subject to any disclaimer, the term of this patent is extended or adjusted under 35 U.S.C. 154(b) by 33 days.

(21) Appl. No.: 14/999,159

(22) Filed: Apr. 4, 2016

(65) Prior Publication Data
US 2017/0282722 A1  Oct. 5, 2017

(51) Int. Cl.
*B60L 8/00* (2006.01)
*B60L 11/18* (2006.01)
*B60H 1/00* (2006.01)
*B60H 1/24* (2006.01)
*B60L 1/00* (2006.01)

(52) U.S. Cl.
CPC .......... *B60L 8/006* (2013.01); *B60H 1/00385* (2013.01); *B60H 1/00835* (2013.01); *B60H 1/00878* (2013.01); *B60H 1/24* (2013.01); *B60L 1/003* (2013.01); *B60L 11/1809* (2013.01); *B60L 11/1861* (2013.01); *B60L 2240/34* (2013.01); *Y02T 10/7005* (2013.01); *Y02T 10/7083* (2013.01); *Y02T 90/16* (2013.01); *Y02T 90/168* (2013.01); *Y04S 30/12* (2013.01)

(58) Field of Classification Search
CPC ...... B60L 8/006; B60L 1/003; B60L 11/1861; B60L 11/1809; B60L 2240/34; B60H 1/24; B60H 1/00385; B60H 1/00835; B60H 1/00878; Y02T 10/7083; Y02T 90/16; Y02T 90/168; Y02T 10/7005; Y04S 30/12
See application file for complete search history.

(56) References Cited

U.S. PATENT DOCUMENTS

| | | | | |
|---|---|---|---|---|
| 5,917,304 A * | 6/1999 | Bird | ........................ | B60L 8/00 320/101 |
| 6,138,781 A * | 10/2000 | Hakala | ................... | B60K 16/00 180/165 |
| 6,857,492 B1 * | 2/2005 | Liskey | ................... | B60K 16/00 180/165 |
| 7,665,554 B1 * | 2/2010 | Walsh | ................... | B60K 16/00 180/165 |
| 8,434,574 B1 * | 5/2013 | York | ..................... | B60K 16/00 180/2.2 |
| 8,664,782 B1 * | 3/2014 | Kim | ........................ | F03G 7/08 290/1 R |
| 2009/0301796 A1* | 12/2009 | Wedderburn, Jr. | ...... | B60K 6/12 180/2.2 |
| 2010/0140006 A1* | 6/2010 | Frierman | ............... | B60K 16/00 180/165 |

(Continued)

*Primary Examiner* — Jason Holloway
(74) *Attorney, Agent, or Firm* — Mark Ogram

(57) ABSTRACT

The invention provides an alternative electrical charging system for a vehicle which is at least partially powered by electricity. The system employs a wind driven generator which produces electricity in response to air motion. When the generator is operating, electricity is communicated the battery of the vehicle. Operation of the generator involves a controller that monitors the electrical status of the battery and selectively activates a fan or opens a ducting system communicating with the generator. The controller also, in some embodiments, monitors the motion and the attitude of the vehicle.

13 Claims, 2 Drawing Sheets

(56) References Cited

U.S. PATENT DOCUMENTS

| | | | | |
|---|---|---|---|---|
| 2011/0031043 A1* | 2/2011 | Armani | ............... | F03D 9/00 |
| | | | | 180/2.2 |
| 2011/0156404 A1* | 6/2011 | Haddad | ............ | B60K 16/00 |
| | | | | 290/55 |
| 2011/0298241 A1* | 12/2011 | Varns | ............ | B60H 1/00014 |
| | | | | 296/64 |
| 2012/0085587 A1* | 4/2012 | Drouin | ............ | B60K 16/00 |
| | | | | 180/2.2 |
| 2013/0263911 A1* | 10/2013 | Bryson | ............ | B60L 8/003 |
| | | | | 136/244 |

* cited by examiner

ELECTRICAL VEHICLE CHARGING SYSTEM

BACKGROUND OF THE INVENTION

This invention relates generally to electrical and hybrid vehicles and more particularly to alternative charging systems therefor.

Fuel efficiency has always been a concern. When the private need for fuel efficiency is combined with the public's need for less polluting vehicles, there is a natural push towards electric or hybrid vehicles. Recent advances in batteries have made such vehicles more efficient, practical and appealing to the public. Whereas some electric/hybrid vehicles had limited range, the current models have eliminated the vast majorities of the complaints of yester year.

The push now is for increasing the miles per gallon of fuel for hybrids and the range for electric vehicles. This generally has taken on two different approaches: solar cells and capturing electricity in some other way. As example, some hybrid vehicles capture electrical energy from the braking action itself.

Any efficient and easily used method for adding additional charging to the battery is always an advantage.

It is clear from the foregoing that there is a need for alternative methods for charging the battery system of an electrical vehicle.

SUMMARY OF THE INVENTION

The invention provides an alternative electrical charging system for a vehicle being at least partially powered by electricity. The system employs a wind driven generator which produces electricity in response to airflow. When the generator is operating, electricity from the generator is communicated to the battery of the vehicle. Operation of the generator involves a controller that monitors the electrical status of the battery and selectively activates a fan and/or opens a ducting system communicating an air-flow/motion with the generator.

Within the present invention, the use of a wind/air powered generator is employed to selectively (depending on a variety of conditions) engaged. The wind/air powered generator is used to provide an auxiliary source of electricity for the batteries within the vehicle.

Those of ordinary skill in the art readily recognize a variety of all-electric and hybrid electric vehicles, including, but not limited to those described in: U.S. Pat. No. 9,238,497, entitled "Electric Motorcycle" issued to Matsuda on Jan. 19, 2016; U.S. Pat. No. 9,242,644, entitled "Electrically-Powered Vehicle" issued to Hirasawa et al. on Jan. 26, 2016; and, U.S. Pat. No. 9,242,560, entitled "Electric Vehicle" issued to Hashimoto on Jan. 26, 2019; all of which are incorporated hereinto by reference.

The electricity produced by the electrical generator of the present invention is communicated y to the batteries for proper storage of the electricity. The condition of the battery is monitored by the computer to see if a charge is required. Then a fan is activated to cause the generator to operate. Alternatively, the damper is directed to pass an airflow over the generator and the electricity therefrom is communicated to the battery of the vehicle.

A variety of charging systems are obvious to those of ordinary skill in the art. These include that described in U.S. Pat. No. 9,242,570, entitled "Charging System for Mild Hybrid Vehicle" issued to Kim et al. on Jan. 26, 2016; and U.S. Pat. No. 8,441,140, entitled "Method and System for Air Velocity Generated Electric Power" issued to Abou-Zeid on May 14, 2013; both of which are incorporated hereinto by reference.

The charging system of the present invention selectively passes the airflow using a ducting mechanism. A damper within the duct is remotely controlled by the computer/controller to communicate the airflow to the generator, exhaust the air into the environment or prevent the air from entering the duct in the first place. Control of the damper is through the use of a computer or controller which opens/closes the damper remotely based upon the sensed conditions of the vehicle itself.

Computers and controllers are well known to those of ordinary skill in the art. Including therewith are the systems described in: U.S. Pat. No. 9,247,094, entitled "Information Processing Device and Information Processing System for Extracting Non-selectable Printing Parameters" issued to Asai on Jan. 26, 2016; U.S. Pat. No. 9,247,399, entitled "Alert Peripheral for Notification of Events Occurring on a Programmable User Equipment and Communication Capabilities" issued to Cavallaro et al. on Jan. 26, 2016; all of which are incorporated hereinto by reference.

While the majority of conditions monitored by the computer/controller are directly related to the battery's condition, one condition which isn't directly related to the battery status is the cabin's temperature. Often, during summer months especially, the internal temperature of the cabin of a parked vehicle becomes excessive. When the temperature becomes excessive, additional energy is required when the driver/occupants enter the vehicle to exhaust/cool the cabin. In this embodiment, where the temperature of the cabin is monitored by the computer/controller, as the temperature within the cabin reaches a set trigger point, the windows of the vehicle are partially lowered to permit the heated air to escape; or optionally, an exhaust damper is opened to communicated the heated air from the passenger cabin to the environment external to the passenger cabin.

In like fashion, the computer monitors the cabin's temperature and the occupancy sensor to make sure the cabin's temperature, when occupied, stays within a defined range (ideally 45 to 85 degrees Fahrenheit). Using either the air condition or the heating mechanisms within the vehicle, the temperature within the cabin is maintained within this range.

In this context, a variety of occupancy sensors are obvious to those of ordinary skill in the art, including, but not limited to those described in: U.S. Pat. No. 9,067,509, entitled "Seat Occupancy Determination Apparatus" issued to Fujii, et al. on Jun. 30, 2015; U.S. Pat. No. 9,150,132, entitled "Vehicle Comfort System with Efficient Coordination of Complementary Thermal Unit" issued to Hoke, et al. on Oct. 6, 2015; and U.S. Pat. No. 9,162,769, entitled "Occupancy Sensor that Measures Electric Current Through a Heating Element" issued to Rauh, et al. on Oct. 20, 2015; all of which are incorporated hereinto by reference.

Thermal sensors are well known to those of ordinary skill in the art and include, but are not limited to those described in U.S. Pat. No. 9,247,678, entitled "Method and Apparatus for Controlling a Coolant Circuit Thermally Coupled to a Power Electronics Device" issued to Ballnik et al. on Jan. 26, 2016; U.S. Pat. No. 9,243,943, entitled "Air-Flow Sensor for Adapter Slots in a Data Processing System" issued to Moore et al. on Jan. 26, 2016; U.S. Pat. No. 9,244,191, entitled "Real-Time Synchronous Measuring System for Multiple Factors such as Wind-blown Sand Electric Field, Sand Particle Charging and Wind Speed" issued to Zhen et al. on Jan. 26, 2016; U.S. Pat. No. 9,246,201, entitled "Battery Temperature Control Device" issued to Takanezawa et al. on Jan. 26, 2016; all of which are incorporated hereinto by reference.

In some embodiments of the invention, the placement of the intake and the outflow in the duct is designed to assist in the aerodynamics of the vehicle. In this embodiment, the intake/inlet is position at an external location at a point of air compression created during movement the vehicle. In a similar design consideration, the outlet for the duct is position at a point of minimal air compression or suction or even less than ambient conditions. In this manner, the actual aerodynamics of the vehicle are greatly improved by simultaneously reducing motion resistance (from the high pressure area) and the drag (from the suction) on the vehicle.

For this embodiment, a motion sensor generates motion data indicative of motion of the vehicle. When the vehicle is experiencing motion, the damper associated with the duct inlet is opened to assist in the aerodynamics and to produce an auxiliary flow of electricity to the battery. The motion sensor either senses motion (such as using a mercury switch) or by taking a pressure reading at the inlet/intake of the duct.

Another condition of the vehicle is the attitude of the vehicle. As a basic fact, when the vehicle is going down-hill, the kinetic energy can be captured by the generator without affecting the efficiency of the vehicle itself. In this embodiment, when the computer receives sensor data indicating that the attitude of vehicle is downward, the damper is opened and the generator is activated. In similar fashion, if the attitude of the vehicle is upward (indicting that a hill is being climbed), then the damper is closed.

A variety of mechanisms are available to measure the attitude of a vehicle and are obvious to those of ordinary skill in the art. These include U.S. Pat. No. 9,194,332, entitled "In-Flight Attitude Control and Direct Thrust Flight Control System of a Vehicle and Craft Comprising such a System" issued to Caubet et al. on Nov. 24, 2015; U.S. Pat. No. 9,222,835, entitled "Multi-Angle Colorimeter" issued to Teroka et al. issued Dec. 29, 2015; U.S. Pat. No. 9,238,462, entitled "Control Apparatus for Vehicle" issued to Kikuch et al. on Jan. 19, 2016; and of which are incorporated hereinto by reference.

The invention, together with various embodiments will be more fully explained by the accompanying drawings and the following description thereof.

DRAWINGS IN BRIEF

DRAWINGS IN DETAIL

Figure 1:
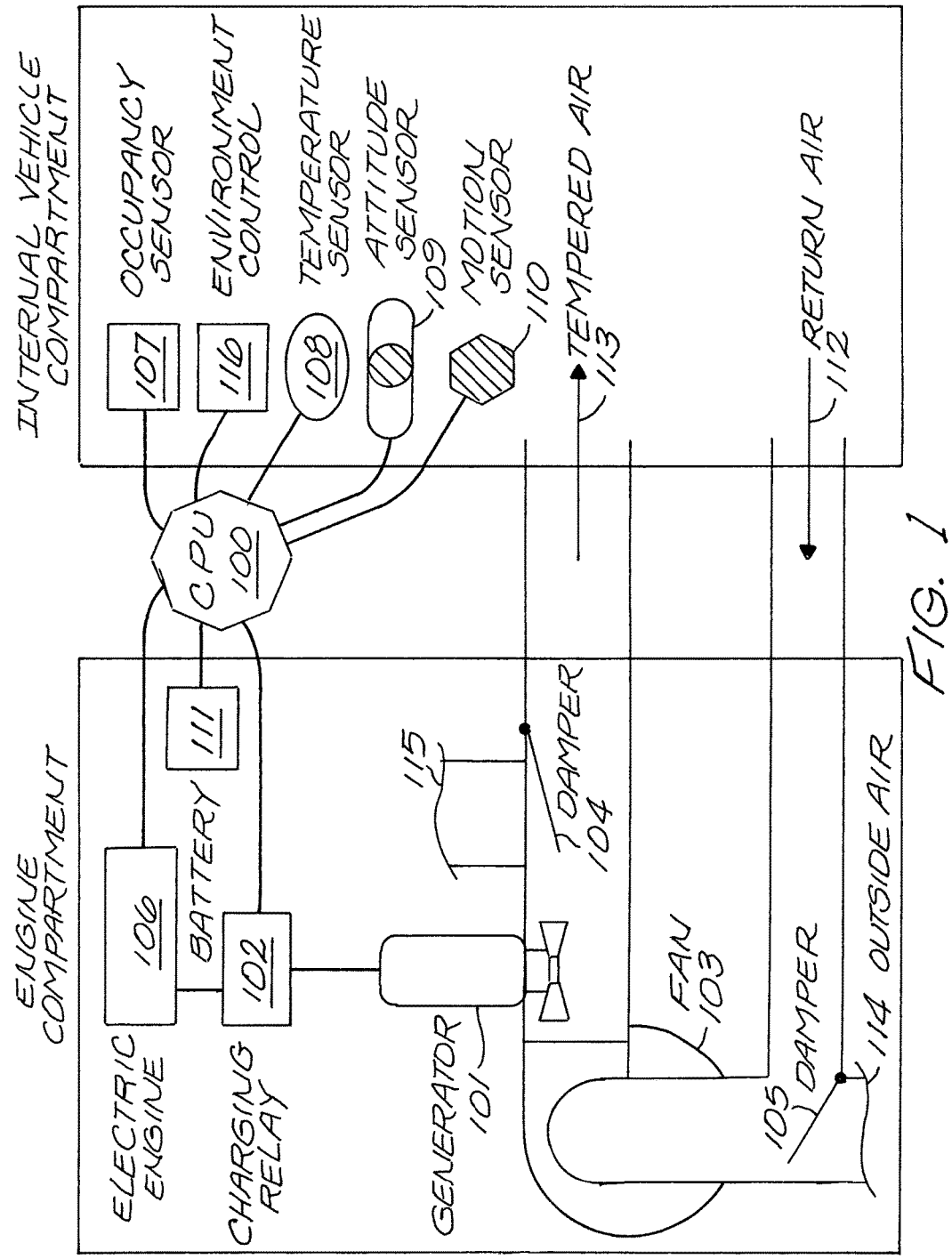
FIG. 1 is a schematic of the component interactions for the preferred embodiment.

FIG. 1 is a schematic of the component interactions for the preferred embodiment.

Central Processing Unit (CPU) 100 is positioned to receive data signals and produce control signals to operate remote apparatus. In this function, CPU 100 receives data from: the Occupancy Sensor 107 which generates a signal on if a passenger is in the passenger compartment of the vehicle; the Temperature Sensor 108 which generates a signal on the temperature with the passenger compartment of the vehicle; the Attitude Sensor 109 which indicates the relationship of the vehicle relative to the horizontal; the Motion Sensor 110 which generates data indicating if the vehicle is in motion; Battery Sensor 111 indicating the charge status of the battery; and environmental control mechanism 116 (air conditioning and heating) used to control the temperature of the interior vehicle compartment.

CPU 100 uses the data from these different sensors to control different operations within the vehicle.

Using data from the Occupancy Sensor 107 and the Temperature Sensor 108, CPU 100 adjusts damper 105 to open/close which causes either return air 112 or outside air 114 to be communicated to fan 103. As example, if the vehicle is occupied (as indicated by Occupancy sensor 107) and the temperature is above an upper limit (as indicated by Temperature Sensor 108) the outside air 114 is drawn by fan 103 to ventilate the interior of the vehicle as indicated by arrow 113.

Alternatively, CPU 100 causes the environmental control 116 to be activated to maintain a desired temperature within the internal vehicle compartment.

In like fashion, tempered air 113 is stopped when CPU 100 operates damper 104 to pass the air to exhaust port 115.

The airflow passing through the duct from fan 103, passes over generator 101 which generates electricity communicated to charging relay 102. CPU 100 utilizes the data from the battery sensor 111 in determining if charging relay 102 should be closed allowing the electricity from generator 101 to pass to the electric engine 106.

Additionally, fan 103 is operated by CPU 100 to activate generator 101.

In some embodiments of the invention, CPU 100 will close/open the charging relay 102 based upon data from the attitude sensor 109 (indicating if the vehicle is going up/down hill) and motion sensor 110 indicating if the vehicle at rest or in motion. When moving downhill, the generator is engaged and the battery is charged.

In this manner, the vehicle's battery is provided with additional electrical charging to assist in the overall efficiency of the vehicle.

Figure 2:
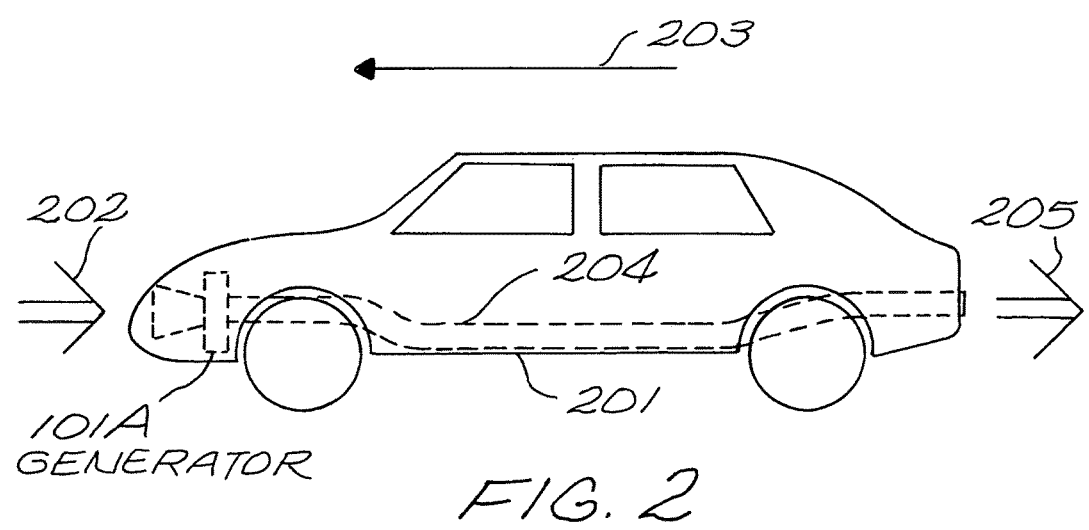
FIG. 2 illustrates and embodiment of the invention employing the fluid dynamics of the vehicle.

FIG. 2 illustrates and embodiment of the invention employing the fluid dynamics of the vehicle.

In this illustration, vehicle 201 is moving as indicated by arrow 203. This motion causes a high pressure situation to exist at the front of the vehicle 201 (compression) while at the rear of the vehicle drag (suction) is created. These two factors, if left unchecked, reduce the overall efficiency of the vehicle. This embodiment of the invention reduces the compression force and decreases the suction force.

Duct 204 has an opening at the front of vehicle 201 where compression occurs in this illustration. In another embodiment of the invention, the duct's opening is near the front windshield where compression also occurs. Duct 204 directs the high pressure airflow to pass by generator 101A which generates electricity as discussed above to charge the battery of the vehicle 201. This assists in reducing the high pressure at the front of the vehicle.

Duct 204 exhausts the airflow as indicated by arrow 205 into an area of the vehicle where traditionally there is a suction force. This exhaust airflow helps to reduce the suction or drag on the vehicle.

In this manner, the fluid dynamics of the vehicle are improved while providing an additional source of electrical energy for the vehicle.

It is clear that the present invention provides for an efficient method for charging the battery system of an electrical vehicle.

What is claimed is:

1. A vehicle at least partially powered by electricity comprising:
   a) a fan selectively generating air motion;
   b) a generator producing electricity in response to the air motion;
   c) a ducting system having a remotely controlled at least one damper adapted to selectively communicate air through the ducting system to the generator and, d) a controller selectively operating the at least one damper to selectively allow either ambient an air flow or internal cabin air through the ducting system to the generator in response to a status of said battery.

2. The vehicle according to claim 1, further including a battery status mechanism communicating an electrical status data to the controller.

3. The vehicle according to claim 2, wherein,
a) the ducting system communicates with a passenger cabin of the vehicle; and,
b) the controller selectively communicates an airflow from the ducting system to the passenger cabin.

4. The vehicle according to claim 3, wherein the ducting system includes a secondary damper selectively communicating an airflow from the ducting system to the passenger cabin.

5. The vehicle according to claim 4, wherein the ducting system communicates an air flow to the generator from a point of air compression created by movement of said vehicle.

6. The vehicle according to claim 1,
a) further including a vehicle motion sensor; and,
b) wherein the controller selectively communicates an air flow from the ducting system to the generator in response to signals from said vehicle motion sensor.

7. The vehicle according to claim 6, wherein the controller communicates air to the generator when signals from the vehicle motion sensor indicate that the vehicle is stationary.

8. The vehicle according to claim 1,
a) further including a vehicle attitude sensor indicating an orientation of the vehicle to horizontal; and,
b) wherein the controller selectively communicates an air flow from the ducting system to the generator in response to signals from said vehicle attitude sensor.

9. The vehicle according to claim 8, wherein the controller communicates air to the generator when signals from the vehicle attitude sensor indicate that the vehicle is pointed below the horizontal.

10. A charging system for a vehicle comprising:
a) a battery storing electrical energy;
b) a generator producing electricity in response to air motion, said generator, when operating, communicating electricity to a battery of the vehicle;
c) a ducting system having at least one damper adapted to selectively communicate air to the generator or to exhaust air to the environment; and,
d) a controller selectively activating the at least one damper to communicate an air flow to the generator via said ducting system in response to a status of said battery.

11. The charging system according to claim 10, wherein,
a) an inlet to the ducting system communicates with a point of air compression created during movement the vehicle; and,
b) the controller operates the remotely controlled at least one damper in response a magnitude of the air compression.

12. The vehicle according to claim 11, wherein the controller selectively communicates an air flow from the ducting system to the generator in response to motion of the vehicle.

13. The vehicle according to claim 10, further including a fan for selective creation of the air motion.

* * * * *